S. J. BOWERS.

Horse Collar Fastening.

No. 9,448. Reissued Nov. 9, 1880.

Witnesses

Nat. E. Oliphant

Geo. R. Porter.

Inventor

Sylvester J. Bowers, per Chas. H. Fowler

Attorney.

N. PETERS, PHOTO-LITHOGRAPHER, WASHINGTON, D. C.

UNITED STATES PATENT OFFICE.

SYLVESTER J. BOWERS, OF CANANDAIGUA, NEW YORK.

HORSE-COLLAR FASTENING.

SPECIFICATION forming part of Reissued Letters Patent No. 9,448, dated November 9, 1880.

Original No. 232,590, dated September 28, 1880. Application for reissue filed October 14, 1880.

*To all whom it may concern:*

Be it known that I, SYLVESTER JAY BOWERS, of Canandaigua, in the county of Ontario and State of New York, have invented certain new and useful Improvements in Horse-Collar Couplings; and I do hereby declare the following is a full, clear, and exact description of the invention, that will enable others skilled in the art to which it appertains to make and use the same, reference being had to the accompanying drawings, and to the letters of reference marked thereon, which form a part of this specification.

Figure 1:
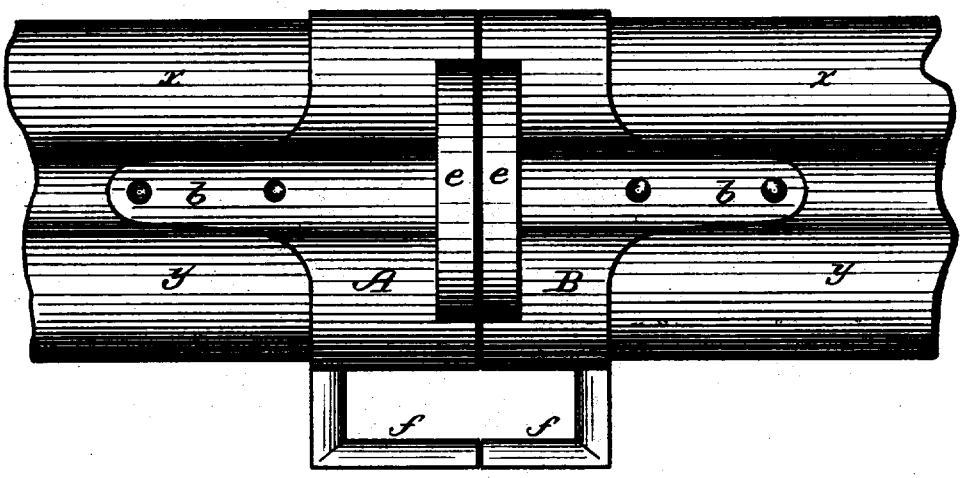
Figure 2:
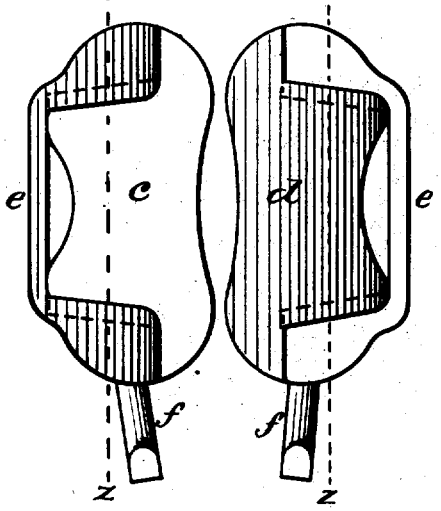
Figure 3:
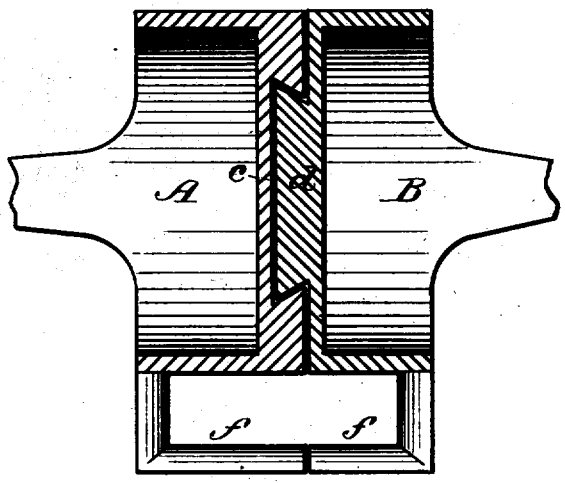

Figure 1 of the drawings is a front elevation of the coupling, showing the sections thereof connected to their respective ends of a horse-collar. Fig. 2 is a face view of the two sections of the coupling, showing the dovetail groove and tongue for connecting them together. Fig. 3 is a sectional view of the two coupling-sections when connected together, the section being taken on line *z z* of Fig. 2.

The present invention has relation to certain new and useful improvements in that class of couplings for horse-collars adapted to be connected to the free ends thereof, the sections of said coupling being held together by a dovetail device.

The invention consists in the peculiar construction of the coupling, as illustrated in the drawings and hereinafter described.

In the accompanying drawings, A B represent the two sections of the coupling, composed of any suitable metal, and cast with ears *b*, two upon each section. These ears are located midway of the ends of the coupling, with such relation to the rolls of the collar, as represented by *x y*, that the ears will locate themselves between said rolls. This is considered a decided advantage over those couplings having the ears embracing the rolls instead of between them, as in my invention. The ears *b* being located between the rolls of the collar, the rivets will pass through solid leather instead of through the rolls, which are stuffed with straw. In the first case there is greater firmness and less liability of the sections working loose, while in the old way of passing the rivets through the stuffed rolls the sections will invariably work loose and render the coupling insecure.

The sections A B are connected together by a dovetail tongue and groove, the section A having a dovetail groove, *c*, to receive a tongue, *d*, upon the section B. This dovetail device, unlike those heretofore in use, is formed on the sections transversely or crosswise of the length of the contacting faces, the advantage being that they are easier of adjustment, with less strain upon a close or box-top collar. It is also easier manufactured by casting, requiring no coring, and the necessity of a spring or other like device for holding the sections together is entirely avoided, for the simple reason that the harder the holdback-strap strains upon it the tighter the joint becomes, while the tendency of all other dovetail couplings is to pull apart by the holdback-strap.

Each section A B is formed with a bridge, *e*, so that when the sections are coupled together the two bridges will form a loop for the hame-strap, to prevent it from shoving forward and off the collar in holding back heavy loads going down hill.

This improvement is especially adapted to team or heavy harness, where the breast-strap hitches above and in the ring of the hame, leaving, as it always has, the hame entirely free to leave the collar and slide forward on the horses' necks, which lets the loaded wagon on the heels of the horses, and frequently causes serious accidents.

It should be understood that the hame-strap loop is not for the purpose of holding collar or hame together separate from each other, but expressly to hold collar and hame together and prevent them from becoming detached.

The sections A B are each formed with an angle-bar, *f*, so that when the sections are together the angle-bars will form a guard to receive and hold the breast-pole or holdback strap to its place in the center of the bottom of the collar and on the coupling. This feature of my invention is considered of great importance, as it effectually accomplishes the great design of saving the wear of the collar where the pole-strap is wound around the bottom of it, the guard holding the holdback-strap firmly in its place and entirely preventing it from sliding to either side and off the coupling and wearing the collar, as has been the case heretofore, especially on hack-collars, where the holdback-strap runs on an angle to the end of the pole, invariably sliding the strap inside the center of collar off the coupling and on the bare leather. This soon wears the leather of the collar through, and in such case the improvement of the guard effectually obviates the above-named difficulty, and is therefore considered of very great importance.

Having now fully described my invention, what I claim as new, and desire to secure by Letters Patent, is—

1. The coupling-sections A B, having ears *b* connected to the collar between the rolls thereof and secured by rivets or other similar means, substantially as and for the purpose set forth.

2. The coupling-sections A B, having a dovetail groove, *c*, and tongue *d* running transversely or crosswise of the contacting ends of the sections, the latter also having ears *b* adapted to be connected to the collar between the rolls thereof, substantially as and for the purpose set forth.

3. The sections A B, having bridges *e*, to form a hame-strap loop when the sections are coupled together, as set forth.

4. The two coupling-sections A B, each of which has an angle-bar, *f*, so that when the sections are coupled together the two angle-bars will form a guard for the breast-pole or holdback strap, substantially as and for the purpose specified.

SYLVESTER J. BOWERS.

Witnesses:
J. P. FAMOT,
ANDREW L. HALL.